No. 794,643. PATENTED JULY 11, 1905.
J. H. RIMPLER & S. C. SELF.
ART OF MANUFACTURING DECOY DUCKS OR THE LIKE.
APPLICATION FILED DEC. 22, 1904.

Inventors:
John H. Rimpler
Samuel C. Self,

Witnesses:
Arthur W. Crossley
L. S. Burket

Attorneys

No. 794,643.

Patented July 11, 1905.

UNITED STATES PATENT OFFICE.

JOHN H. RIMPLER AND SAMUEL C. SELF, OF GOSHEN, INDIANA.

ART OF MANUFACTURING DECOY-DUCKS OR THE LIKE.

SPECIFICATION forming part of Letters Patent No. 794,643, dated July 11, 1905.

Application filed December 22, 1904. Serial No. 237,995.

*To all whom it may concern:*

Be it known that we, JOHN H. RIMPLER and SAMUEL C. SELF, citizens of the United States, residing at Goshen, in the county of Elkhart and State of Indiana, have invented new and useful Improvements in the Art of Manufacturing Decoy-Ducks or the Like, of which the following is a specification.

This invention has relation to the art of manufacturing decoy-ducks, as well as various kinds of images, providing improvements whereby articles of the kinds mentioned may be formed by a very simple process and rendered durable to the utmost degree, the mode being so simple in its attainments as not to call for a high degree of skill in its performance and yet to allow the best of work to be provided.

The process is not limited to the making of decoy-ducks, though particular description as to how it may be employed to produce the same will enable those skilled in the art to understand its use in making other things.

The drawings annexed are to be referred to as forming a part of this description.

Figure 1:
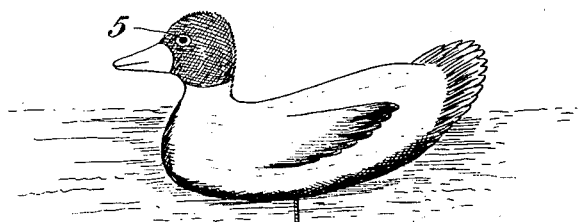
Figure 2:
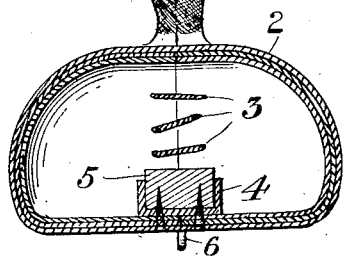
Figure 3:
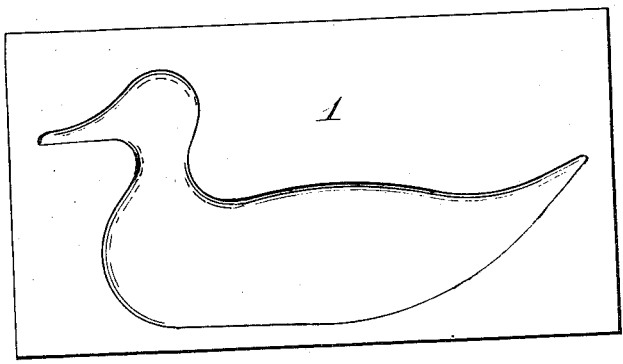
Figure 4:

Figure 1 is a perspective view of a decoy-duck made in accordance with this process. Fig. 2 is a cross-sectional view of the same. Fig. 3 is a side view of a mold for making one-half of a decoy-duck in accordance with this process. Fig. 4 is a similar view of a mold for forming a vase or like article by this method.

Similar marks of reference refer to like parts in the several views.

In the drawings, 1 designates a mold for the formation of one half of, say, a decoy-duck, there being another mold of like character (not shown) for making the other half of the article, which mold it is not deemed necessary to show in order to give clear understanding of the invention. The mold 1 may be made of plaster-of-paris or any other suitable substance and is so formed as that anything molded therein will have the form of half of a duck, divided longitudinally.

We first thoroughly oil the inside surface of the mold in order that the paper or other substance from which the article is made will not stick thereto. We then commence by laying into the mold sheets of stout paper or paper-pulp thoroughly pasted or cemented together. The thickness of the layers may be as great as is needed, and it may be thicker at one point than another, if desired. These layers of paper pasted together are designated by the symbol 2. Fill or cover one half of the mold to completeness, and when the two halves are formed they are put in an oven and dried, which makes them hard and tough to a degree that renders them almost bullet-proof. The next step is to paraffin both parts thoroughly, or as thoroughly as is necessary, and subsequently dry them both outside and inside. When this is done, the two halves are dressed off at their edges and sewed together with a strong thread or cord 3, the weight 4 being put in before the parts are finally closed. The weight 4 consists of a trough-shaped piece of lead or other similar metal, in which is laid a strip of wood 5 in order to the better nail or fasten the weight to the bottom of the decoy, as is shown in Figs. 1 and 2. After being sewed together the lines of union are pressed and covered by pasting paper thereover to as great thickness as is desired, when it is thoroughly dried again. Instead of sewing the halves together at this time they may be completed as far as possible and then painted and then sewed together. Otherwise the sewing together of the halves may be effected and the painting done afterward, when the eyes 5, of glass, will be put in and a screw-eye 6 will be turned in the bottom, to which a cord 7 will be tied in order that the user may control it when in the water, or a weight 8 may be attached to the end of the cord to hold it steadier than would otherwise be the case.

A decoy-duck thus formed can be thrown to any reasonable distance without danger of breaking or injuring it, and it will stand rough usage without material injury, as would not be the case with any similar article now known to us.

It should have been stated that we prefer, finally, to treat the article with a waterproof varnish—such, for instance, as spar-varnish and paraffin—so that should it become frozen in ice or remain in the water for a very long time it will not be injured thereby.

It is to be understood that we do not confine our invention to the manufacture of decoy-ducks, since by the invention an article may be made to simulate a vase, for example, of which a half-mold 1' is shown in Fig. 4. The said mold 1' may be used in the same manner as has been described with respect to the decoy-duck mold (shown in Fig. 3) to make a vase, the interior being equipped or constructed as desired, and so on with images of men or animals, articles of furniture, cases, buckets, flower-pots, photographers' furnishings, childrens' toys, helmets, &c., to which the process may be adapted.

We claim—

The art of manufacturing decoy-ducks and cognate articles of manufacture, which consists in pasting paper into molds each containing a fraction of the form of the thing to be produced, one thickness after another, until each mold is supplied with the desired amount or thickness of the material; then putting the fractional parts so formed into an oven and drying or baking the same; then sewing the fractional parts together with a strong thread or cord to make a complete article; then covering the cords or sewing by pasting paper thereover; and drying and finishing the same as described.

In testimony whereof we affix our signatures in presence of two subscribing witnesses.

JOHN H. RIMPLER.
SAMUEL C. SELF.

Witnesses:
  OSCAR JAY,
  C. P. YODER.